United States Patent [19]
Trabanino

[11] 3,888,019
[45] June 10, 1975

[54] LANDING GEAR POSITION SIMULATOR
[76] Inventor: Humberto Trabanino, 318 Vagabond Dr., Murray, Utah 84107
[22] Filed: Apr. 24, 1974
[21] Appl. No.: 463,434

[52] U.S. Cl. ............................... 35/12 B; 35/12 F
[51] Int. Cl. ....................................... G09b 9/08
[58] Field of Search ............ 35/5, 6, 8 R, 9 R, 12 B, 35/12 F, 12 C, 12 W, 12 R, 12 N, 19 A, 22 R, 11, 13, 10.2; 272/1 C; 340/27 R, 27 NA; 235/184; 73/178 T

[56] References Cited
UNITED STATES PATENTS

| | | |
|---|---|---|
| 3,091,040 | 5/1963 | Schierhorst ........................ 35/8 R |
| 3,161,852 | 12/1964 | Timm ................................ 340/27 R |
| 3,456,363 | 7/1969 | Boxley ................................ 35/13 |
| 3,546,350 | 12/1970 | Reynolds ............................ 35/12 B |
| 3,815,262 | 6/1974 | Patterson et al. .................. 35/12 B |

*Primary Examiner*—Lawrence Charles
*Assistant Examiner*—Vance Y. Hum
*Attorney, Agent, or Firm*—Criddle & Thorpe

[57] ABSTRACT

A self-contained, landing gear position simulator for use in an aircraft includes first and second panels oriented in different planes. Five lamps and a manually operable switch are mounted on the first panel and four manually operable switches are mounted on the second panel. When the switch on the first panel is moved to a first position to simulate a control action of retracting the aircraft landing gear, a first lamp on the first panel is lighted, and when the switch is moved to a second position to simulate a control action of extending the aircraft's landing gear, the first lamp is extinguished and second, third and fourth lamps are lighted. When one of the four switches on the second panel is operated, a corresponding one of the first, second, third or fourth lamps is prevented from being lighted. The simulator also includes apparatus responsive to a predetermined air speed indication of the aircraft for lighting a fifth lamp.

4 Claims, 2 Drawing Figures

3,888,019

1

LANDING GEAR POSITION SIMULATOR

BACKGROUND OF THE INVENTION

This invention relates to aircraft control simulators and more particularly to a landing gear position simulator.

The use of simulators has long been known to be a safe and yet effective way of providing pilot training and of improving pilot skills especially when transition to higher performance aircraft is contemplated. Such simulators typically present various stimuli to a training pilot who is to take certain actions in response to the stimuli. The actions taken by the pilot may be observed by an instructor and a determination made as to whether the actions were appropriate. The pilot's actions may also provide an input to the simulation equipment which may then present additional stimuli to the pilot depending upon the actions taken. In this manner, a pilot is placed in a simulated flying environment whereby he can improve his skills before he advances to more complex and sophisticated aircraft.

Generally, simulation systems are designed for use on the ground and involve rather complicated and expensive equipment. So far as is known, there are few, if any, simulation systems designed for use in an aircraft while actually flying.

SUMMARY OF THE INVENTION

It is an object of the present invention to provide a landing gear position simulator for use in an aircraft and especially for use in an aircraft having fixed landing gear.

It is also an object of the present invention to provide such a simulator which is simple in construction and yet sufficiently versatile in function to enable an instructor to present to a student a variety of stimuli representing different landing gear conditions or operations.

These and other objects and advantages of the present invention are realized in a specific illustrative embodiment of a landing gear position simulator designed for use in an aircraft and including first and second panels oriented in different planes, and first, second, third, fourth and fifth visual indicators mounted on the first panel and a manually operable landing gear control simulation switch also mounted on the first panel. When the simulation switch is moved to a first position to simulate a control action of retracting the aircraft's landing gear, the first visual indicator is activated, and when the simulation switch is moved to a second position to simulate a control action of extending the landing gear, the second, third and fourth visual indicators are activated. The fifth visual indicator is activated in response to a predetermined aircraft speed indication if the simulation switch is in the first position. First, second, third and fourth switches are mounted on the second panel and these switches are manually operable to selectively prevent the activation of the first, second, third and fourth visual indicators respectively.

BRIEF DESCRIPTION OF THE DRAWINGS

The above and other objects, features and advantages of the present invention will become apparent from the following detailed description presented in connection with the accompanying drawings in which.

2

Figure 1:
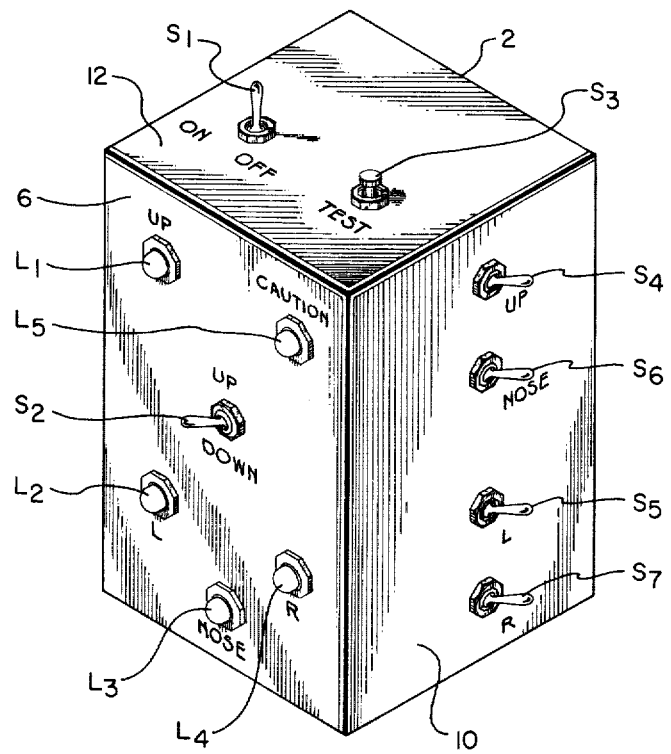
FIG. 1 shows an illustrative embodiment of a landing gear position simulator made in accordance with the principles of the present invention.
Figure 2:
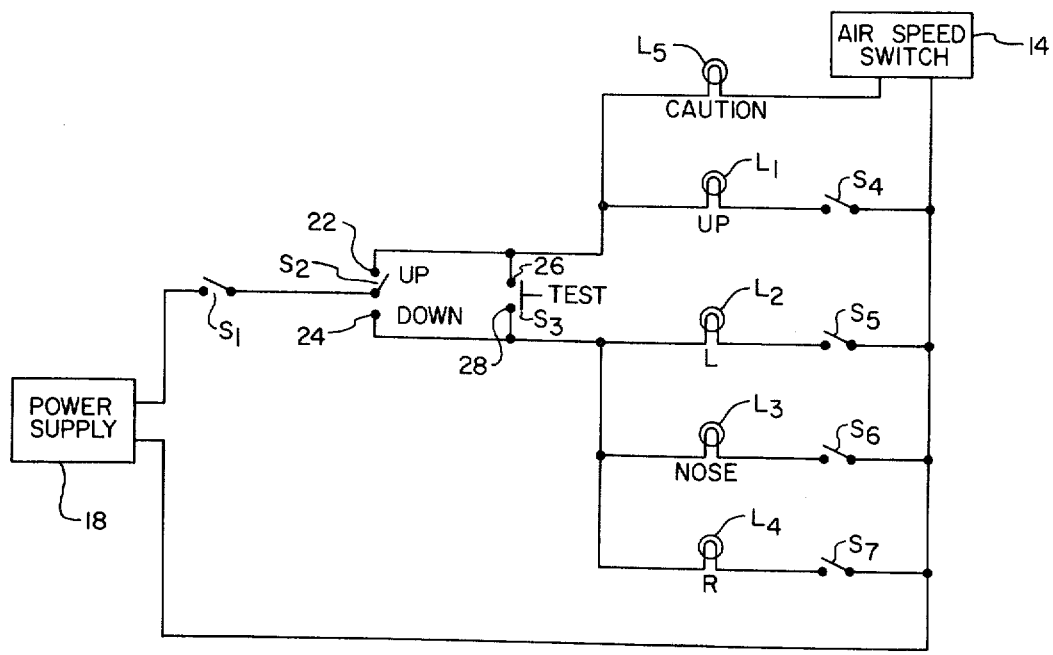

FIG. 2 shows a schematic diagram of a circuit for use in the simulator of FIG. 1.

DETAILED DESCRIPTION

There is shown in FIG. 1 a portable landing gear position simulator designed for use in aircraft and, in particular, in an aircraft having fixed landing gear. The simulator, under control of an instructor and in response to certain actions of a student pilot, present various visual stimuli to the student pilot. The student pilot then responds to this stimuli either by performing some control operation with the aircraft or with the simulator.

The simulator of FIG. 1 includes a housing 2 having a first panel or exterior surface area 6 and a second panel or exterior surface area 10. The plane in which the panel 6 lies is disposed at a right angle to the plane in which the panel 10 lies. The housing 2 also includes a third panel or exterior surface 12 whose plane is oriented at a right angle to both the planes of the panel 6 and panel 10.

Five lamps L1 through L5 are mounted on panel 6 and, when lighted, indicate various simulated conditions to the student pilot. A two-position toggle switch S2 is also mounted on panel 6 and is provided to enable the student pilot to take certain simulated control actions with respect to the aircraft landing gear. Specifically, movement of the switch S2 to its UP position represents a control action for causing the retracting of the aircraft's landing gear, and movement of the switch S2 to its DOWN position represents a control action for causing the extending of the landing gear. (Of course, the aircraft's landing gear is not actually operated by any movement of the switch S2, since this is a simulated procedure for training purposes only.) When the switch S2 is placed in its UP position, the lamp L1 is lighted to represent that the landing gear is retracted, and when the switch is placed in its DOWN position, lamps L2, L3 and L4 are lighted to represent that left, nose and right landing gears, respectively, are lowered. The lamp L5, which is a caution lamp, is lighted if the switch S2 is in the UP position and if an indication is supplied to the simulator that the air speed of the aircraft is at or below some predetermined value. If the lamp L5 is lighted, movement of the switch S2 to the DOWN position extinguishes the lamp.

Lamp L1 might advantageously be of one color (e.g., red), lamp L5 of another color (e.g., yellow), and lamps L2 through L4 of still another color (e.g. green).

A two-position toggle switch S1 is mounted on panel 12 for turning on or turning off the simulator circuitry contained in the housing 2. When the toggle switch S1 is in the OFF position, then none of the lamps may be lighted, but when the switch is placed in the ON position, then the lamps may be lighted depending upon the position of switch S2. A push botton test switch S3 is also mounted on panel 12 for testing whether or not the lamps L1 through L5 are in operable condition. When the switch S3 is depressed, lamps L1 through L5 are lighted (unless burned out or unless certain switches S4 through S7, or a so-called air speed switch, are in a given position as will hereafter be described).

Four two-position toggle switches S4 through S7 are mounted on panel 10, each switch being provided for disabling or preventing a corresponding one of the lamps L1 through L4 from being lighted regardless of the position of the switch S2. Thus, when switch S4 is moved to a certain position, the lamp L1 is prevented from being lighted, when switch S5 is moved to a certain position, lamp L2 is prevented from being lighted, when switch S6 is moved to a certain position, lamp L3 is prevented from being lighted, and when switch S7 is moved to a certain position, lamp L4 is prevented from being lighted. The switches S4 through S7 are provided to enable the instructor to simulate certain "trouble" conditions. Thus, the condition of switch S5 being moved so that the lamp L2 cannot be lighted would indicate to the student pilot that the left landing gear of the aircraft was not in an extended position. The student pilot should thus be stimulated to take some kind of corrective action, for example, such as landing the aircraft with the left wing raised as one would do if the left landing gear were actually inoperative. The other switches S4 through S7 would be used by the instructor at will to provide similar "trouble" conditions.

The simulator of FIG. 1 is positioned in the aircraft at a location where panel 6 is within view and reach of the student pilot and panel 10 is within reach and view of the instructor. Advantageously, panel 10 would not be within the view of the student pilot. This would generally be the case if the simulator of FIG. 1 were placed between the student pilot (in the left-hand seat of the aircraft) and the instructor (in the right-hand seat).

FIG. 2 is a schematic diagram of an exemplary circuit of the simulator of FIG. 1. The circuit includes a power supply 18 which might illustratively be a six volt D.C. battery for a portable simulator unit. The power supply 18 is coupled to the switch S1 which, in turn, is in series with the switch S2. One stationary terminal 22 of the switch S2 is coupled to lamps L1 and L5, which are coupled in parallel. An air speed switch 14 is coupled in series with the lamp L5 for controlling the lighting of the lamp. The air speed switch 14 might illustratively be any conventional aircraft throttle actuated switch or any conventional air flow actuated switch. Such switches are currently used in aircraft, for example, for stall warning purposes. The air speed switch 14 closes when the speed of the aircraft drops below some predetermined air speed to thereby provide an electrical closed loop between the lamp L5 and the power supply 18. The switch S4 is coupled in series with the lamp L1 to provide an electrical connection between the lamp L1 and the power supply 18. The air speed switch 14 might alternatively be a manually operable switch for use by the instructor to indicate a reduced speed. In such a case, the switch would advantageously be mounted on panel 10 of the FIG. 1 structure.

Another stationary contact 24 of the switch S2 is coupled to lamps L2, L3 and L4, which are coupled in parallel with each other. Switches S5, S6 and S7 are connected in series with lamps L2, L3 and L4 respectively for connecting the lamps to the power supply 18. The test switch S3 is coupled to both stationary contacts 22 and 24 of switch S2 to, in effect, bypass switch S2 and provide a means of testing the operability of lamps L1 to L5.

When the on-off switch S1 is closed (or ON), and the switch S2 is in the UP position, lamp L1 is lighted so long as switch S4 is closed. Also, lamp L5 is lighted if the air speed switch 14 is closed, indicating that the speed of the aircraft is below the predetermined value discussed earlier. Lighting of the lamp L5 provides a warning or caution stimulus to the student pilot that the simulated landing gear conditions are not adequate for landing and that the student pilot should take some corrective action. When the switch S2 is in the DOWN position, lamps L2, L3 and L4 are lighted providing switches S5, S6 and S7 are closed. Of course, opening any of the switches S4 through S7 when the corresponding lamps are lighted would cause extinguishment of that lamp since the connection to the power supply 18 would be interrupted.

When the test switch S3 is depressed to close contacts 26 and 28 (and assuming switch S1 is closed), power is supplied to lamps L1 through L5 regardless of the setting of switch S2. This test switch, as indicated earlier, is provided to facilitate a test of whether or not any of the lamps L1 through L5 are operable.

With the simulator shown and described above, various landing gear positions and landing gear trouble conditions can be simulated under control of either the instructor or the student pilot. The instructor, of course, controls the switches S4 through S7 to simulate the trouble conditions and the student pilot controls the switch S2 to simulate the control action of retracting or extending the landing gear.

It is to be understood that the above-described arrangement is only illustrative of the application of the principles of the present invention. Numerous other modifications and alternative arrangements may be devised by those skilled in the art without departing from the spirit and scope of the invention and the appended claims are intended to cover such modifications and arrangements.

What is claimed is:

1. A landing gear position simulator for use in an aircraft capable of seating a student pilot and an instructor and having apparatus for generating an indication of aircraft speed comprising a housing having at least first and second exterior surfaces oriented in different planes, said housing being positionable in the aircraft so that the first surface is viewable by a student pilot and the second surface is viewable by an instructor, first, second, third and fourth lamps mounted on said first surface, said first lamp, when lighted, representing that the left and right landing gear are in the retracted position, and said second and third lamps, when lighted, representing that left and right landing gear respectively of the aircraft are in the extended position, a manually operable landing gear control simulation switch mounted on said first surface, said switch, when operated to a first position, representing a control action to simulate movement of the landing gear to a retracted position, and, when operated to a second position, representing a control action to simulate movement of the landing gear to an extended position, means for supplying power to illuminate said first lamp when said switch is in the first position and for supplying power to illuminate said second and third lamps when said simulation switch is in the second position, means responsive to an aircraft speed indication for supplying power to illuminate said fourth lamp if said simulation switch is in the first position, and first, second and third manually operable switches mounted on said second surface for selectively preventing the lighting of said first, second and third lamps respectively.

2. A simulator as in claim 1 wherein the first lamp is of a certain color, the second and third lamps are of a different color, and the fourth lamp is of a color different from the colors of the first through third lamps.

3. A simulator as in claim 1 further comprising a third exterior surface, and a test switch mounted on said third surface which, when operated, supplies power to illuminate all of said lamps.

4. A landing gear position simulator for use in an aircraft capable of seating a student pilot and an instructor and including apparatus for generating an indication of the aircraft speed comprising first and second panels positioned in different planes, said simulator being positioned in the aircraft so that the student pilot may view the first panel and the instructor may view the second panel, first, said second and third indicators, when activated, representing that left and right landing gear respectively of the aircraft are in the extended position, and said first indicator, when activated, representing that the landing gear are in the retracted position, a manually operable landing gear control simulation switch mounted on said first panel, wherein movement of said switch to a first position simulates a control action to retract the landing gear and movement of said switch to a second position simulates a control action to extend the landing gear, first, second and third manually operable switches mounted on said second panel for selectively preventing the activation of said first, second and third visual indicators respectively, and a fourth visual indicator mounted on said first panel, and means responsive to an aircraft speed indication for activating said fourth visual indicator if said simulation switch is in the first position.

* * * * *